UNITED STATES PATENT OFFICE.

ROBERT GANS, OF BERLIN-GRUNEWALD, GERMANY.

PROCESS OF REMOVING OXYGEN FROM WATER.

1,117,831. Specification of Letters Patent. Patented Nov. 17, 1914.

No Drawing. Application filed September 15, 1913. Serial No. 789,916.

*To all whom it may concern:*

Be it known that I, ROBERT GANS, a citizen of the German Empire, residing at Berlin-Grunewald, in the Kingdom of Prussia, Germany, have invented certain new and useful Improvements in the Process of Removing Oxygen from Water; and I do hereby declare the following to be a full, clear, and exact description of the invention, such as will enable others skilled in the art to which it appertains to make and use the same.

My invention relates to improvements in the process of removing oxygen from water, which is used either for domestic or industrial purposes. As is known, water which at being boiled in steam boilers, or which under ordinary pressure and temperature gives off gaseous oxygen causes corrosion of the iron.

The object of the improvements is to provide a process in which this corrosion is avoided. And with this object in view my invention consists in providing a process by means of which the oxygen of the water is removed.

The oxygen can be removed from the water by adding to the water any one of the reducing sulfur compounds, such for example as sulfurous acid, hydrosulfurous acid, or one of the polythionic acids, (di-, tri-, tetra- or pentathionic acid), or sulfureted hydrogen, or the salts of such compounds, which compounds or salts may be added either by the theoretically corresponding quantities, or by insufficient quantities or in excess. The oxygen is readily taken up by these sulfur compounds which are oxidized by the oxygen. If desired the process may be made more effective by adding slight amounts of suitable catalytic substances, such for example as iron salts, copper salts, etc. For example, if the water contains 7 grams of oxygen in one cubic meter, I add about 46 grams of $NaHSO_3$ or about 56 grams of $Na_2SO_3$. By adding slight amounts of a suitable copper salt the absorption of the oxygen is considerably facilitated. Another example consists in adding to the above water 20 grams of $Na_2S$ or other sulfids, for example sulfids of the heavy metals, or sulfhydrates, or polysulfids, in which case a suitable catalyst may likewise be added if desired.

I claim:

1. The hereindescribed process of removing free oxygen from water intended for domestic or industrial purposes, which consists in adding to the water a reducing sulfur compound and a salt of copper.

2. The herein described process of removing free oxygen from water which is designed for domestic or industrial purpose, which consists in adding to the water reducing sulfur compounds, and a suitable catalyst.

In testimony whereof I hereunto affix my signature in the presence of two witnesses.

ROBERT GANS.

Witnesses:
  HEINRICH KRIEGOHEIM,
  WALTER GERSTAF.